(12) United States Patent
Yacoub

(10) Patent No.: US 9,752,497 B2
(45) Date of Patent: Sep. 5, 2017

(54) DILUTION OF THE GAS IN AN INTAKE MANIFOLD BY WATER INJECTION

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 763 days.

(21) Appl. No.: 13/759,775

(22) Filed: Feb. 5, 2013

(65) Prior Publication Data

US 2013/0206100 A1 Aug. 15, 2013

(30) Foreign Application Priority Data

Feb. 14, 2012 (DE) .................. 10 2012 202 220

(51) Int. Cl.
| | |
|---|---|
| *F02B 47/02* | (2006.01) |
| *F02M 25/028* | (2006.01) |
| *F02B 3/06* | (2006.01) |
| *F02M 1/00* | (2006.01) |
| *F02M 25/022* | (2006.01) |
| *F02B 29/04* | (2006.01) |
| *F02M 31/08* | (2006.01) |
| *F02M 26/13* | (2016.01) |

(52) U.S. Cl.
CPC ........... *F02B 47/02* (2013.01); *F02M 25/028* (2013.01); *F02M 25/0227* (2013.01); *F02B 3/06* (2013.01); *F02B 29/0406* (2013.01); *F02M 1/00* (2013.01); *F02M 25/022* (2013.01); *F02M 26/13* (2016.02); *F02M 31/08* (2013.01); *F02M 2700/4321* (2013.01); *Y02T 10/121* (2013.01)

(58) Field of Classification Search
CPC ............. F02M 1/00; F02M 2700/4321; F02M 25/022; F02B 47/02; F02B 3/06
USPC ....................................................... 123/25 A
See application file for complete search history.

(56) References Cited

U.S. PATENT DOCUMENTS

| | | | |
|---|---|---|---|
| 4,096,839 A * | 6/1978 | Niertit .................. | F02D 41/144 123/434 |
| 6,415,745 B1 | 7/2002 | Hellén et al. | |
| 7,958,872 B1 * | 6/2011 | Schechter ............... | 123/568.11 |
| 8,104,456 B2 | 1/2012 | Yacoub | |
| 2004/0045281 A1* | 3/2004 | Ahrens et al. ................. | 60/285 |

(Continued)

FOREIGN PATENT DOCUMENTS

| | | |
|---|---|---|
| DE | 10204181 C1 | 10/2003 |
| DE | 102004032777 A1 | 7/2005 |
| DE | 102010001892 B1 | 6/2011 |

*Primary Examiner* — Jacob Amick
*Assistant Examiner* — Charles Brauch
(74) *Attorney, Agent, or Firm* — Greg Brown; McCoy Russell LLP

(57) ABSTRACT

Systems and methods for reducing $NO_x$ emissions are provided, comprising: adjusting an amount of water injected into an intake manifold responsive to an oxygen concentration, temperature and pressure in the intake manifold; and heating the injected water if humidity is higher than a threshold. Water injected into the intake manifold decreases the temperature of, and dilutes the oxygen content of intake gases thereby decreasing $NO_x$ emissions.

20 Claims, 6 Drawing Sheets

(56) References Cited

U.S. PATENT DOCUMENTS

| | | | |
|---|---|---|---|
| 2007/0084423 A1* | 4/2007 | LeBeaux | 123/1 A |
| 2009/0167216 A1* | 7/2009 | Soma et al. | 318/376 |
| 2010/0199639 A1* | 8/2010 | Matsunaga | F01N 3/0842 60/278 |

* cited by examiner

DILUTION OF THE GAS IN AN INTAKE MANIFOLD BY WATER INJECTION

CROSS REFERENCE TO RELATED APPLICATIONS

The present application claims priority to German Patent Application No. 102012202220.1, filed on Feb. 14, 2012, the entire contents of which are hereby incorporated by reference for all purposes.

TECHNICAL FIELD

The present application relates to reduction of nitrogen oxides emissions of an internal combustion engine.

BACKGROUND AND SUMMARY

Ever more stringent legal regulations regarding the pollutant emissions of internal combustion engines demand that, for environmental protection reasons, the nitrogen oxides ($NO_x$) emissions of internal combustion engines are continuously further reduced. Exhaust-gas aftertreatment with regard to nitrogen oxides is expensive, requires intensive servicing, may not be reliable and involves high maintenance costs. In particular, additional, complex components may be required, for example for a post-injection of fuel, carbamide (urea) or the like. It is sometimes necessary for the machine to be run in a separate operating range while the aftertreatment or regeneration processes take place.

The generation of nitrogen oxides is a direct result of the combustion process. This means that the generation of nitrogen oxides can also be influenced by a change to the combustion process, whereby the demand for an aftertreatment of the exhaust gas can be at least reduced. The generation of nitrogen oxides is promoted by high combustion temperatures and an abundance of oxygen in the combustion gas. It is accordingly sought to keep the combustion temperatures low and to dilute the combustion gas, that is to say, to lower the oxygen content in the combustion gas to the required minimum.

For this purpose, it is known for a part of the exhaust gas to be recirculated into the intake manifold of the internal combustion engine. This is referred to as exhaust-gas recirculation, EGR. An example of exhaust-gas recirculation can be found in DE 10 2009 046 370 A1.

Since the exhaust gas naturally has no oxygen or a small residual oxygen content, it constitutes an inert gas which is available continuously during operation. By adding EGR, the overall oxygen content in the gas mixture for the internal combustion engine can be reduced. The exhaust gas may either be branched off upstream of the exhaust-gas aftertreatment arrangement (for example a diesel particle filter) and supplied downstream of the compressor, or else may be branched off downstream of the exhaust-gas aftertreatment arrangement and supplied upstream of the compressor. The first case is also referred to as high-pressure exhaust-gas recirculation, because the exhaust gas is at high pressure during the recirculation, and the second case is, correspondingly, referred to as low-pressure exhaust-gas recirculation, because the exhaust gas experiences a pressure drop as it passes through the exhaust-gas aftertreatment arrangement and may subsequently be compressed again together with the inlet air by the compressor.

High-pressure exhaust-gas recirculation has the disadvantage that soot particles can accumulate in the intake manifold of the internal combustion engine, which impairs the scavenging efficiency, that is to say the purging of the exhaust gas out of the cylinder by the supply of the combustion gas for the subsequent ignition process. Low-pressure exhaust-gas recirculation substantially eliminates said disadvantage because exhaust gas which has already been purified by the exhaust-gas aftertreatment arrangement is recirculated. Here, however, the work performed by the compressor increases because more gas may be compressed; furthermore, the regulation of the low-pressure exhaust-gas recirculation is complex.

It is also known for water to be injected directly into the intake manifold in order to lower the combustion temperature. Such a device is described for example in DE 102 04 181 C1. Here, however, it is a disadvantage that a corresponding water reservoir is carried and regularly replenished, wherein the frequency of replenishment is determined by the water consumption.

In light of the above mentioned disadvantages, a first aspect of the disclosure therefore introduces a method for reduction of the nitrogen oxides emissions of an internal combustion engine. The method of the disclosure may be implemented with or without exhaust-gas recirculation, as a result of which the above-mentioned problems may be eliminated or minimized. The method of the present disclosure also minimizes the amount of water injected such that a correspondingly smaller water reservoir may be carried and the water reservoir replenished less frequently.

The present disclosure describes a system and method to reduced $NO_x$ emissions of an internal combustion engine by injecting water into an intake manifold, thereby reducing combustion chamber temperatures and diluting oxygen content of intake air. A method of the present disclosure may maintain a desired oxygen concentration as a function of the gas pressure and temperature in the intake manifold and the rate, or amount, of water injection into the intake manifold. Maintenance of the oxygen concentration ($[O_2]$) is achieved, in part, by monitoring $[O_2]$ in the intake manifold and maintaining the relative humidity below 100% by further monitoring the temperature and pressure. Water injection is controlled responsive to a calculated relative humidity setpoint and desired oxygen concentration. Maintaining the relative humidity below 100% sustains the injected water in the vapor form. Furthermore, the object of the present disclosure may be used in conjunction with, or in the absence of exhaust-gas recirculation.

Systems and methods for reducing $NO_x$ emissions are provided, comprising: adjusting an amount of water injected into an intake manifold responsive to an oxygen concentration, temperature and pressure in the intake manifold; and heating the injected water if humidity is higher than a threshold. Water injected into the intake manifold decreases the temperature of, and dilutes the oxygen content of intake gases thereby decreasing $NO_x$ emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

The present disclosure details the injection of water into the intake manifold. The amount of water injected is controlled according to the air pressure and temperature within the intake manifold. Controlling for pressure and temperature allows for precise control of injection of water into the manifold such that the relative humidity is below 100% and injected water remains in the vapor state. In this way and in conjunction with an intake manifold oxygen sensor, oxygen concentration dilution may be controlled. The object of the present disclosure will be described in greater detail below with reference to the FIGS.

Figure 1:
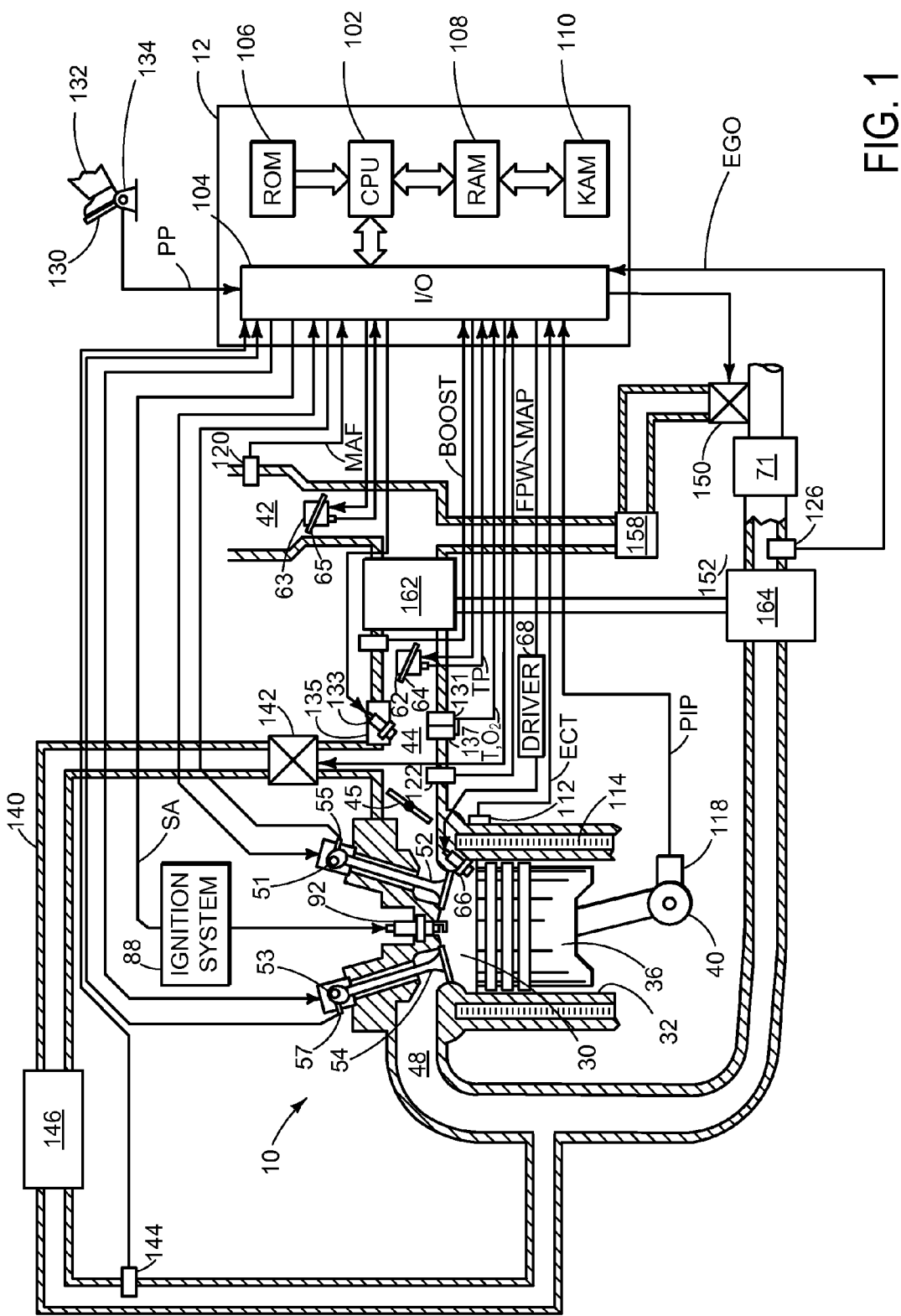
FIG. 1 shows a schematic diagram of an engine including high-pressure and low-pressure exhaust gas recirculation systems.

Referring now to FIG. 1, a schematic diagram of one cylinder of multi-cylinder engine 10, which may be included in a propulsion system of an automobile, is shown. Engine 10 may be controlled, at least partially, by a control system including controller 12 and by input from a vehicle operator 132 via an input device 130. In this example, input device 130 includes an accelerator pedal and a pedal position sensor 134 for generating a proportional pedal position signal PP. Combustion chamber (or cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Furthermore, combustion chamber 30 draws in water vapor which may be injected into intake manifold 44 by water injector 133. Injector 133 is surrounded by water heater 135. Heater 135 may be capable of increasing the temperature of water to be injected or of the water within intake manifold 44 so that a relative humidity threshold is not surpassed and water is maintained in its vapor state.

Heater 135 may be a heat exchanger or electric heating unit. Furthermore, heater 135 may be powered by recuperative braking such that operating of the heating unit may not increase engine load. In some embodiments, heater 135 may be absent and temperature control of intake air may be achieved by bypassing coolers 146 or 158 within the exhaust gas recirculation system described below.

Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, engine 10 may be operated in a compression ignition mode, with or without an ignition spark. In some embodiments, the ignition system may include a dual spark system which includes two spark plugs per cylinder (not shown).

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12. Further, intake manifold 44 may include charge motion control valve 45 for controlling the intensity of charge motion occurring in combustion chamber 30.

Further, in some, example disclosed embodiments, an exhaust gas recirculation (EGR) system may route a desired portion of exhaust gas from exhaust passage 48 to intake passage 44 via high-pressure EGR (HP-EGR) passage 140 and/or low-pressure EGR (LP-EGR) passage 150. The amount of EGR provided to intake passage 44 may be varied by controller 12 via HP-EGR valve 142 or LP-EGR valve 152. In some embodiments, a throttle may be included in the exhaust to assist in driving the EGR. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high-pressure EGR system where EGR is routed from upstream of a turbine of a turbocharger to downstream of a compressor of a turbocharger and a low-pressure EGR system where EGR is routed from downstream of a turbine of a turbocharger to upstream of a compressor of the turbocharger. Further, as shown in FIG. 1, the HP-EGR system may include a first, HP-EGR cooler 146 and the LP-EGR system may include a second, LP-EGR cooler 158 to reject heat from the EGR gasses to engine coolant, for example. In alternative embodiments, engine 10 may include an HP-EGR system or only an LP-EGR system, or no EGR system. A method in accordance with the present disclosure may decrease $NO_x$ emissions even in the absence of EGR.

As such, Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 70 and downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control device 71 is shown arranged along exhaust passage 48 downstream of exhaust gas sensor 126. Emission control devices 71 may be a selective catalytic reduction (SCR) system, three way catalyst (TWC), $NO_x$ trap, various other emission control devices, or combinations thereof. For example, device 71 may be a TWC and a separate particulate filter (PF) (not shown) may also be included in exhaust passage 48. Further, in some embodiments, during operation of engine 10, emission control device 71 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and manifold absolute pressure signal, MAP, from MAP sensor 122. Engine speed signal, RPM, may be generated by controller 12 from signal PIP. Manifold pressure signal, MAP, from a manifold pressure sensor may be used to provide an indication of vacuum, or pressure, in the intake manifold. Oxygen content, $O_2$, within intake manifold 44 as indicated by intake oxygen sensor 131. Intake manifold temperature (T) as indicated by manifold temperature sensor 137. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses per a revolution of the crankshaft.

As described above, FIG. 1 shows one cylinder of a multi-cylinder engine, and each cylinder may similarly include its own set of intake/exhaust valves, fuel injector, spark plug, etc.

Storage medium read-only memory 106 can be programmed with computer readable data representing instructions executable by processor 102 for performing the methods described below as well as other variants that are anticipated but not specifically listed. A non-limiting example of such a method is depicted in FIG. 2.

Figure 2:
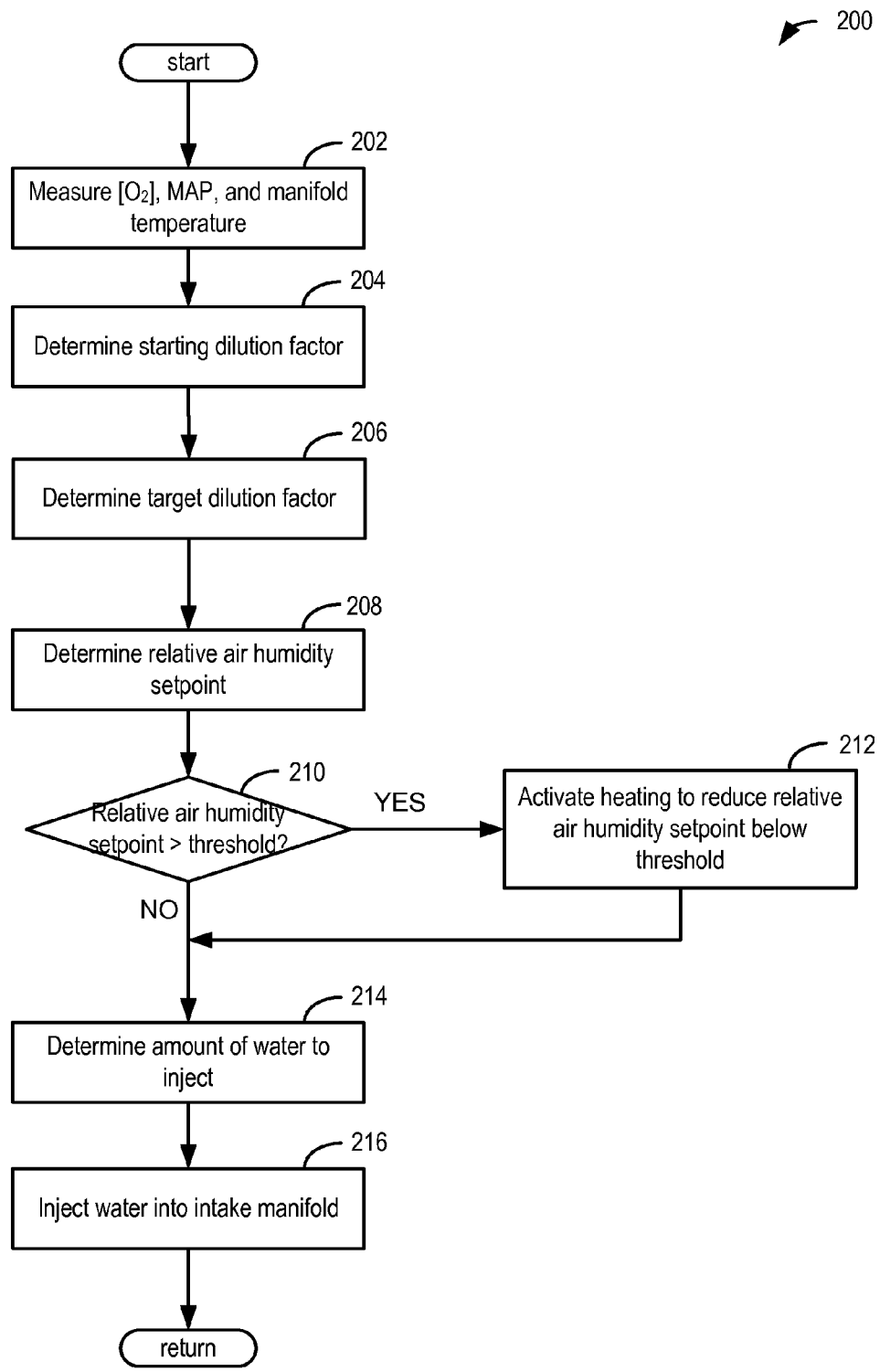
FIG. 2 shows a flow chart depicting a method of the present disclosure.

The method 200 as depicted in FIG. 2 diagrams a method in accordance with the present disclosure to reduce $NO_x$ emissions. Instructions to carry out the method may be saved in read-only memory 106, so that controller 12 may carry out the method. The method starts with an engine on event and continues to 202 where the oxygen concentration ($[O_2]$), manifold absolute pressure (MAP), and manifold temperature are measured. These measurements may be taken by oxygen sensor 131, MAP sensor 122, and manifold temperature sensor 137 respectively.

At 204, a starting dilution factor is determined. The starting dilution factor is an indication of the diluted oxygen concentration within intake air. The starting dilution factor is determined on the basis of the measure oxygen concentrations. The starting dilution factor is a ratio of the measured oxygen concentration within the intake manifold, such as measured by oxygen sensor 131 at step 202 to the oxygen concentration of fresh air. Furthermore, the contribution of recirculated exhaust gas will also affect the starting dilution factor if EGR is present and these effects may vary under different engine operating conditions.

At 206, a target dilution factor is determined. The target dilution factor is based on a desired oxygen concentration in the intake gas, based on a user input and on operating conditions of the engine. Differing oxygen concentrations may be required under different operating conditions such as engine load or speed. The target dilution factor may also vary with the status of exhaust gas aftertreatment systems, if regeneration of an LNT is to be performed, for example.

At 208, a relative air humidity setpoint is determined. The relative air humidity setpoint is the humidity at which the target dilution factor may be achieved and provides an indication of the amount of water to be injected into the intake manifold. The relative air humidity setpoint is a function of the temperature and pressure within the intake manifold as determined at step 202, and the target dilution factor determined at step 206. Maps of the relative humidity setpoint to achieve a target dilution factor at varied temperature and pressure may be saved within engine controller 12 to determine the relative air humidity setpoint for a given set of conditions. Examples of such a map is described below herein with reference to FIG. 4.

At 210 it is determined if the relative air humidity setpoint is above a threshold. The threshold may be 100% humidity, beyond which water injected into the intake manifold would not be sustained in the vapor form. However, another threshold may be used. If the relative air humidity setpoint is greater than a threshold at 210 (YES) the method proceeds to 210 where heating is activated to reduce the relative air humidity setpoint at which the target dilution factor is reached below the threshold. In another example, heating alone may be insufficient to raise the capacity of air to hold water vapor that may achieve a target dilution factor. In this example, EGR, and/or additional engine conditions may be altered to reach the target dilution factor.

Heating the injected water has the effect of increasing the capacity of air within the intake manifold to retain water in its vapor form. If the relative humidity setpoint, the humidity at which the target dilution factor may be reached at present temperature and pressure, is above 100% the injected water may condense in the intake manifold and the target dilution factor may not be reached. By heating the water the relative humidity setpoint may be raised, allowing injected water to vaporize in the intake manifold and thusly, the target dilution factor may be reached.

A gas in the intake manifold may be heated if the relative air humidity setpoint is greater than a threshold humidity or greater than or equal to 100 percent. If, during the course of the determination of the amount of water to be injected into the intake manifold, it is found that the target dilution factor cannot be attained exclusively by water injection at the temperature present in the intake manifold, it is preferable for the gas which is situated in the intake manifold or which is to be supplied to the intake manifold to be heated, whereby a higher target dilution factor based on water injection may be attained. This is based in particular on the fact that a correspondingly warmer gas can also absorb more water vapor without a relative humidity of 100%, or the threshold humidity, being reached, which would result in condensation. In order to heat the gas which is situated in the intake manifold or which is to be supplied to the intake manifold, it is basically possible for the injected water to be heated itself, because the increased temperature thereof also leads to a corresponding increase of the gas in the intake manifold. This may be achieved by heater 135 (shown in FIG. 1).

Conventionally, the combustion air is compressed and the compressed combustion air is supplied to the intake manifold. Here, the gas which is situated in the intake manifold or which is to be supplied to the intake manifold is preferably heated by virtue of a selectable fraction of the compressed combustion air being conducted through a first cooler and a remaining fraction of the compressed combustion air being diverted around the first cooler. If a first cooler is provided, which is conventionally referred to as intermediate cooler, normally all of the compressed air is conducted through the first cooler. However, in order to attain an increase in temperature of the gas in the intake manifold, it is for example possible in said embodiment of the disclosure for a part of the compressed combustion air to bypass the intermediate cooler by a control valve. Here, the expression "heating" may also encompass a purposeful reduction in cooling.

Alternatively, or in addition, the gas which is situated in the intake manifold or which is to be supplied to the intake manifold may also be heated by electric heating. This is expedient in particular in conjunction with recuperative braking, in which kinetic energy is converted into electrical energy during the course of a braking process. In this way, in many driving situations, an excess of electrical energy can be accumulated which may be used for the heating of the gas or of the water to be injected, without resulting in an additionally increased energy consumption.

In another example, the gas in the intake manifold or which is to be supplied to the intake manifold may also be heated by combustion of fuel via a heat exchanger. Such heating methods are known from standstill heaters, but in this case are advantageously used for the heating of the gas in the intake manifold.

It is likewise possible for an exhaust gas of the internal combustion engine to be at least partially recirculated to the intake manifold. This has been described in the introduction as exhaust-gas recirculation. It is however also possible for the exhaust-gas recirculation to be used for heating the gas in the intake manifold, wherein the dilution is attained predominantly through the water injection, which results in a simpler regulating process and, overall, no more than small amounts of soot deposits. In particular, it is also possible for the exhaust gas not to be conducted into the intake manifold but rather for the heat thereof to be transferred to the gas in the intake manifold, or to the gas which is to be supplied to the intake manifold, via a heat exchanger.

Here, the gas which is situated in the intake manifold or which is to be supplied to the intake manifold is preferably heated by virtue of a selectable fraction of the recirculated exhaust gas being recirculated through a second cooler and a remaining fraction of the recirculated exhaust gas being recirculated past the second cooler. It is possible in this way to control the temperature of the recirculated exhaust gas, whereby the degree of heating of the gas in the intake manifold is correspondingly also controlled.

At 214, the amount of water to be injected is determined. According to the present disclosure it is preferable for the amount of water which is to be injected into the intake manifold to be determined as a function of a pressure prevailing in the intake manifold. The disclosure incorporates, and is based on, the realization that the resulting dilution factor is dependent on the prevailing pressure. Accordingly, the amount of water to be injected may be determined differently as a function of the pressure, which leads to minimizing water injected. The determined amount of water particularly preferably increases with the pressure prevailing in the intake manifold. The higher the pressure, the more water is injected, because with increasing pressure, more water is required in order to attain the same resulting dilution factor.

The amount of water is furthermore determined as a function of the measured temperature. The temperature has an influence on the relative air humidity or on the capability of the air to store water. It is desirable for the amount of water injected to be limited such that the relative air humidity does not reach 100%, which would result in the condensation of water in the intake manifold. An increase of the injection of water above said limit would merely increase the water consumption without contributing to the reduction of nitrogen oxides. The determined amount of water particularly preferably decreases with the measured temperature. The higher the temperature in the intake manifold, the less water is required to attain the same resulting dilution factor.

The amount of water injected is further dependent on the oxygen concentration within the intake manifold. The oxygen concentration in the intake manifold is used to calculate the starting dilution factor and thus the difference between the starting dilution factor and the target dilution factor.

Figure 4:
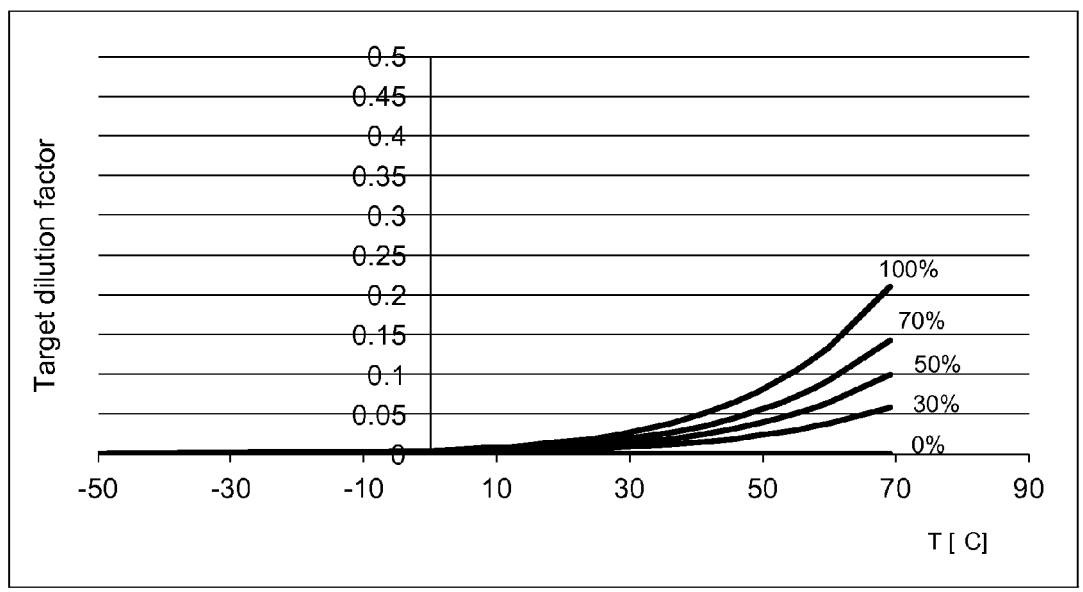
FIG. 4 shows the dilution factor as a function of temperature and relative air humidity.
Figure 5:
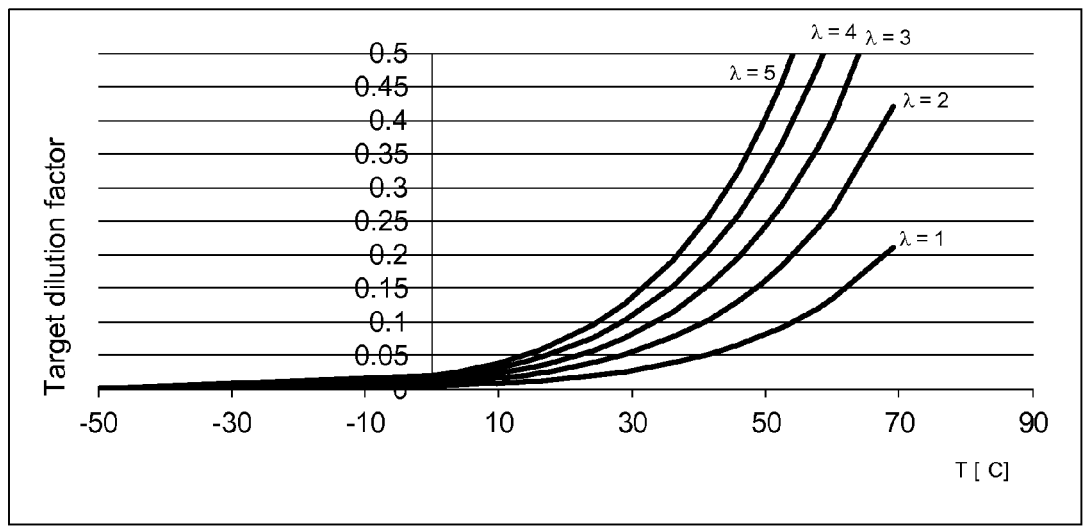
FIG. 5 shows the dilution factor as a function of temperature and lambda.
Figure 6:
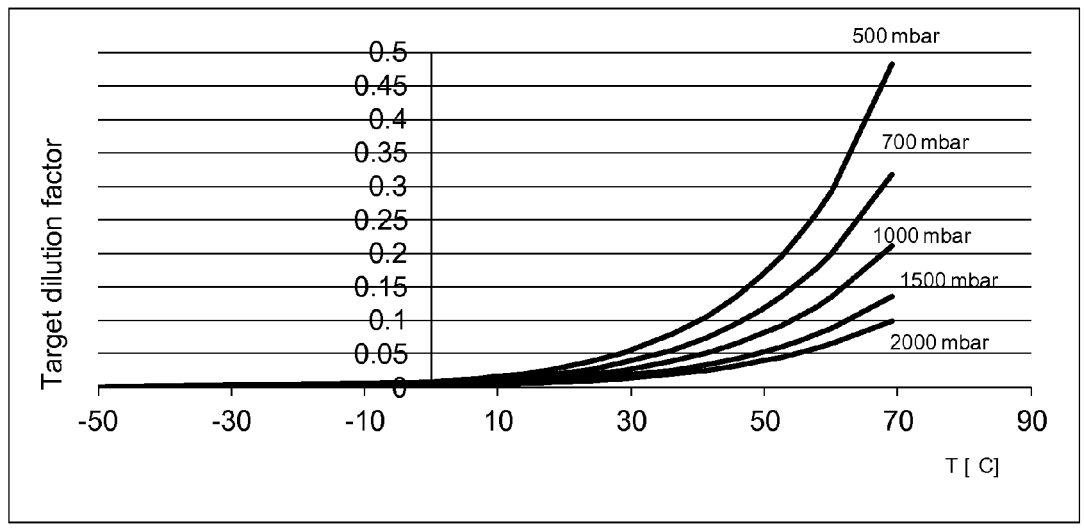
FIG. 6 shows the dilution factor as a function of temperature and pressure.

Described with greater detail below, FIGS. 4-6 show graphs plotting target dilution factor versus temperature for different humidity (FIG. 4), different air-fuel ratio which is a measure of oxygen dilution (FIG. 5), and different pressure (FIG. 6). Data such as this may be used to calculate a target dilution factor which is proportional to the amount of water to be injected. In a non-limiting example, an amount of water to be injected may the maximum amount of water based on differing methods of calculating target dilution factors. In another non-limiting example, an amount of water to be injected may be the minimum amount of water based on the different calculations. In another example, an average of the varied calculations may be used to determine the amount of water to be injected. In a different, non-limiting example, an amount of water injected may consistently defer to one calculation of the target dilution factor, for example the use of pressure in the intake manifold to determine the target dilution factor as described above.

At 216, the amount of water determined at 214 is injected into the intake manifold. The injected water has the effect of reducing temperatures within the intake manifold and diluting the oxygen concentration thus reducing $NO_x$ emissions. The method of the present disclosure provides a way to minimize the amount of water injected so that an on-board reservoir containing the water to be injected may be as small as possible and/or may need less frequent filling.

Figure 3:
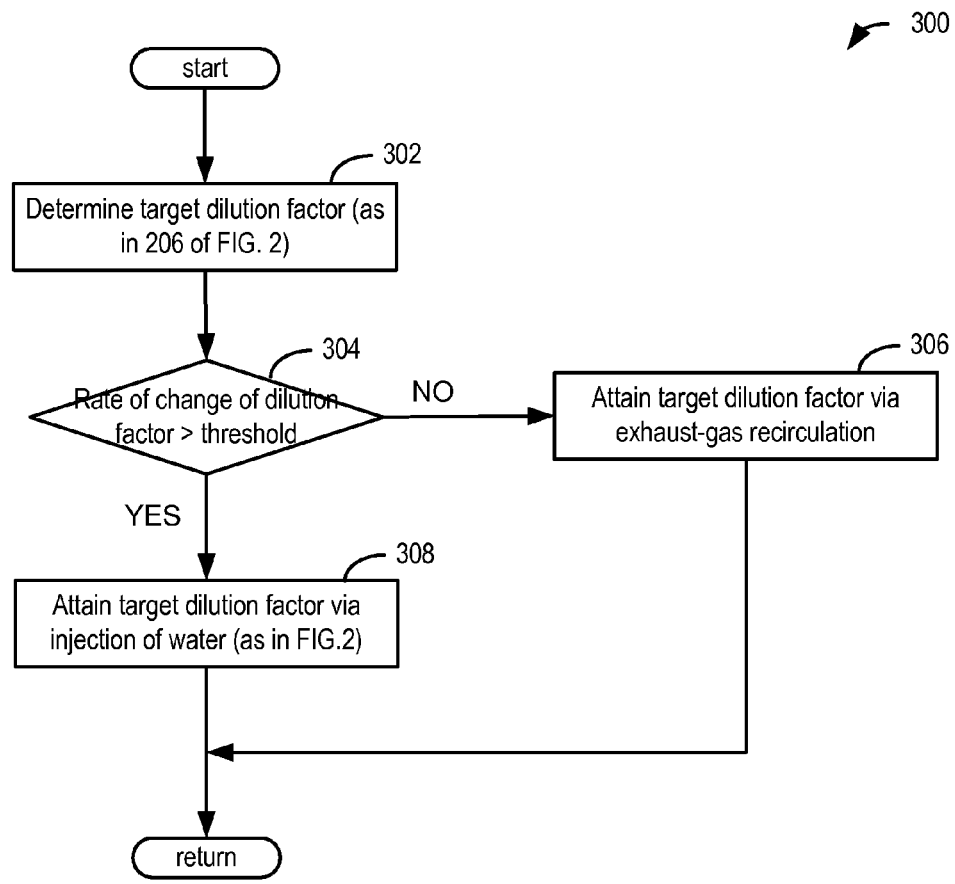
FIG. 3 shows a method of injection of water in conjunction with an EGR system.

Referring now to FIG. 3 a flow chart of an example embodiment of the disclosure is shown. In the method 300, injection of water into an intake manifold is used in conjunction with exhaust-gas recirculation to dilute oxygen concentration in intake gas and, thusly, reduce $NO_x$ emissions.

Exhaust-gas recirculation and water injection may be used together in order to attain the desired dilution of oxygen concentration. In the present embodiment the target dilution factor may be set by injecting water into the intake manifold when a rate of change of the target dilution factor is greater than a threshold rate of change. This scenario may result from changes in the user preset with regard to the operating mode of the internal combustion engine. This means that, in the event of a change in operating mode such as from low load to high load or from operation under load to idle, a fast change in the target dilution factor is realized by the injection of water whereas slow changes are realized by exhaust-gas recirculation. This is advantageous firstly because water is used in particular situations, as a result of which the water consumption is kept low, and secondly because the regulation of the exhaust-gas recirculation is simplified. Furthermore, in the event of a fast increase in power of the internal combustion engine, it may not be possible for sufficient exhaust gas to be provided for the recirculation, because a small amount of exhaust gas was produced in the preceding operating state.

The method 300 starts with an engine on event. At 302, the target dilution factor is determined as described above in reference to 206 in FIG. 2. At 304, it is determined if the rate of change of the target dilution factor is above a threshold. If at 304, the rate of change of the target dilution factor is above the threshold (YES) the method proceeds to 308 where the target dilution factor is attained using injection of water to dilute the oxygen concentration within the intake manifold.

If at 304, the rate of change of the target dilution factor is below a threshold (NO) the method proceeds to 306 where the target dilution factor is attained using exhaust-gas recirculation. Once the target dilution factor is attained either by injection of water (at 308), or through the use of exhaust-gas recirculation (at 306) the method then returns.

Referring now to FIG. 4 a diagram of the target dilution factor as a function of temperature and relative air humidity is shown. In the diagram, the target dilution factor is plotted versus the temperature in degrees Celsius. In each case one curve is illustrated for the relative air humidity setpoints of 0, 30, 50, 70 and 100 percent, wherein with increasing air humidity, the target dilution factor likewise increases. Accordingly, the target dilution factor is at a maximum for a relative air humidity setpoint of 100 percent. Furthermore, the target dilution factor also increases with temperature. This is owing to the fact that the saturation content of water vapor in air, on which the relative air humidity is based, increases with rising temperatures. This means that, at a higher temperature, a larger amount of water is required in order to attain a relative air humidity of 100 percent. Some embodiments of the disclosure make use of this fact in that they increase the capability of the gas in the intake manifold to store water as a result of heating, in order to be able to supply more gaseous water to the combustion process and accordingly attain higher target dilution factors.

FIG. 5 shows the target dilution factor as a function of temperature and lambda. Lambda ($\lambda$) denotes the ratio of the air mass actually available for a combustion process to the minimum stoichiometric air mass required for a full combustion. Therefore, at a lambda value of 1, the air quantity present is exactly that required for a full combustion of the fuel. Mixtures with a higher lambda value are referred to as lean mixtures, and mixtures with a lower lambda value are referred to as rich mixtures.

The diagram of FIG. 5 shows the target dilution factor for a relative air humidity of 100 percent plotted versus the temperature of the gas in the intake manifold, wherein in each case one curve is illustrated for different lambda values of 1 to 5. It can be seen here that, for lean mixtures, it is possible for water injection to attain particularly good target dilution factors which may be attained, but with difficulty, by exhaust-gas recirculation alone, using high recirculation rates.

FIG. 6 shows the target dilution factor as a function of temperature and pressure, wherein again a relative air humidity setpoint of the gas in the intake manifold of 100 percent is assumed. Here, in each case one curve is shown for different pressures from 500 to 2000 mbar. It can be seen that the target dilution factor decreases with increasing pressures. As in FIG. 5, however, the influence of the temperature on the target dilution factor remains unchanged, such that the attainable target dilution factor increases with rising temperatures.

The disclosure makes use of the relationships shown in FIGS. 3-5 in order to provide an improved method for reduction of the nitrogen oxides emissions. The method may be used in the presence of absence of exhaust gas recirculation.

In the present disclosure systems and methods for reducing $NO_x$ emissions are provided, comprising: adjusting an amount of water injected into an intake manifold responsive to an oxygen concentration, temperature and pressure in the intake manifold; and heating the injected water if humidity is higher than a threshold. Water injected into the intake manifold decreases the temperature of, and dilutes the oxygen content of intake gases thereby decreasing $NO_x$ emissions.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for reduction of nitrogen oxides emissions of an internal combustion engine, comprising:
   measuring an oxygen concentration in an intake manifold of the internal combustion engine;
   determining a starting dilution factor based on the measured oxygen concentration, wherein the starting dilution factor is a ratio of the measured oxygen concentration;
   determining a target dilution factor based on a user preset with regard to an operating mode of the internal combustion engine, wherein the target dilution factor is an amount of oxygen dilution with water within the intake manifold;
   determining a relative air humidity setpoint in the intake manifold at which the target dilution factor is attained;
   determining an amount of water to be injected into the intake manifold based on the relative air humidity setpoint; and
   injecting the determined amount of water into the intake manifold.

2. The method of claim 1, wherein determining the amount of water is a function of a pressure prevailing in the intake manifold.

3. The method of claim 2, wherein the determined amount of water increases as the pressure prevailing in the intake manifold increases.

4. The method of claim 1, further comprising measuring a temperature in the intake manifold of the internal combustion engine, wherein the amount of water is determined as a function of the measured temperature, and wherein the relative air humidity setpoint in the intake manifold is a humidity at which the target dilution factor is attained.

5. The method of claim 4, wherein the determined amount of water decreases as the measured temperature increases.

6. The method of claim 1 carried out by an electronic controller, wherein the determination of the relative air humidity setpoint is based on an intake manifold temperature, an intake manifold pressure, and the target dilution factor; wherein the target dilution factor is further based on a desired oxygen concentration in the intake manifold during the operating mode and an air-fuel ratio, where the target dilution factor increases with increasing air-fuel ratio; and the method further comprising heating a gas to be supplied to the intake manifold when the relative air humidity setpoint is greater than a threshold humidity.

7. The method of claim 6, further comprising compressing combustion air, wherein the compressed combustion air is supplied to the intake manifold, and the gas which is to be supplied to the intake manifold is heated by virtue of a selectable fraction of the compressed combustion air being conducted through a first cooler and a remaining fraction of the compressed combustion air being conducted past the first cooler.

8. The method of claim 6, wherein the gas which is to be supplied to the intake manifold is heated by electric heating.

9. The method of claim 6, wherein the gas which is to be supplied to the intake manifold is heated by combustion of fuel via a heat exchanger.

10. The method of claim 1, further comprising recirculating exhaust gas of the internal combustion engine to the intake manifold, wherein the determination of the relative air humidity setpoint is based on an intake manifold temperature, an intake manifold pressure, and the target dilution factor, the relative air humidity setpoint increasing with an increasing target dilution factor and a decreasing intake manifold temperature, and wherein the internal combustion engine includes a piston disposed within each cylinder.

11. The method of claim 10, wherein gas which is to be supplied to the intake manifold is heated by virtue of a selectable fraction of the recirculated exhaust gas being recirculated through a second cooler and a remaining fraction of the recirculated exhaust gas being recirculated past the second cooler.

12. The method of claim 10, wherein the target dilution factor is attained by injecting water into the intake manifold in response to a rate of change of the target dilution factor greater than a threshold rate of change; and wherein the target dilution factor is attained by recirculating exhaust gas in response to a rate of change of the target dilution factor less than the threshold rate of change.

13. An internal combustion engine, comprising:
    an intake manifold;
    an oxygen sensor in the intake manifold;
    an injection device for injecting water into the intake manifold; and
    an engine controller having memory with instructions to determine an amount of water to inject into the intake manifold responsive to a determination of a relative humidity set point based on an oxygen concentration, temperature, and pressure within the intake manifold, where the determined amount of water to inject into the intake manifold increases as the pressure increases and the temperature decreases.

14. A method, comprising:
    via an electronic controller:
      adjusting an amount of water injected into an intake manifold responsive to an oxygen concentration, temperature, and pressure in the intake manifold, where adjusting the amount of water injected into the intake manifold includes increasing the amount of water injected into the intake manifold as the pressure in the intake manifold increases and the temperature in the intake manifold decreases; and
      heating the injected water in response to a determination by the controller that humidity is higher than a threshold humidity.

15. The method of claim 14, wherein heating the injected water is achieved by an electric heater.

16. The method of claim 15, wherein heating the injected water is achieved by the electric heater, the electric heater being powered by recuperative braking.

17. The method of claim 14, wherein heating the injected water is achieved by a heat exchanger.

18. The method of claim 14, wherein heating the injected water is achieved by diverting exhaust gas recirculation flow to bypass a cooler.

19. The method of claim 14, wherein the humidity is a relative humidity set point, where the relative humidity set point is a humidity in the intake manifold at which the oxygen concentration is reached; and wherein the injected water is maintained as vapor in the intake manifold by maintaining the humidity below 100%.

20. The method of claim 14, wherein the threshold humidity is 100% relative humidity.

\* \* \* \* \*